(12) United States Patent
Reiter et al.

(10) Patent No.: US 7,073,550 B2
(45) Date of Patent: Jul. 11, 2006

(54) PNEUMATIC TIRE HAVING BUILT-IN COLORED SEALANT LAYER AND PREPARATION THEREOF

(75) Inventors: Leonard James Reiter, Norton, OH (US); George Frank Balogh, North Canton, OH (US); Michael Julian Crawford, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 287 days.

(21) Appl. No.: 10/802,908

(22) Filed: Mar. 17, 2004

(65) Prior Publication Data

US 2005/0205185 A1 Sep. 22, 2005

(51) Int. Cl.
*B60C 19/12* (2006.01)
*B29C 73/16* (2006.01)

(52) U.S. Cl. ............... 152/503; 152/504; 156/115; 523/166

(58) Field of Classification Search ........ 152/502–504; 523/166; 156/115
See application file for complete search history.

(56) References Cited

U.S. PATENT DOCUMENTS

| 1,061,546 A | * | 5/1913 | Kather ................ 523/166 |
| 3,048,509 A | | 8/1962 | Sweet et al. ............ 154/43.5 |
| 4,140,167 A | | 2/1979 | Bohm et al. ............ 152/346 |
| 4,171,237 A | | 10/1979 | Bohm et al. ............ 156/115 |
| 4,228,839 A | | 10/1980 | Bohm et al. ............ 152/347 |
| 4,895,610 A | | 1/1990 | Egan .................. 156/115 |
| 5,059,636 A | * | 10/1991 | Grenga ................ 523/166 |
| 6,837,287 B1 | * | 1/2005 | Smith, Sr. et al. ........ 152/503 |
| 2003/0155058 A1 | * | 8/2003 | Saito .................. 152/505 |
| 2003/0230376 A1 | | 12/2003 | Smith, Sr. et al. ........ 156/115 |

* cited by examiner

*Primary Examiner*—Geoffrey L. Knable
(74) *Attorney, Agent, or Firm*—Henry C. Young, Jr.

(57) ABSTRACT

This invention relates to a pneumatic tire having a built-in non-black colored sealant layer and its preparation. The sealant layer is derived from a sealant precursor layer comprised of a butyl rubber, organoperoxide, particulate, synthetic amorphous silica and plant-derived organic agricultural seed flour, together with a non-black colored colorant. The butyl rubber-based sealant precursor layer is build into the tire to form a tire assembly and the butyl rubber component of the sealant precursor layer is depolymerized during a subsequent curing of the tire at an elevated temperature in a suitable mold to form the tire having the resultant built-in sealant. The particulate plant derived organic agricultural seed flour is a renewable raw material in a sense that it can be replenished in nature and therefore not as a significant depletion of non-renewable natural resource. The agricultural plant seed flour is comprised of at least a portion of a ground plant seed (e.g. whole or partial seed portion including for example its nucleus and/or shell) of an agricultural seed producing plant such as, for example, wheat, rye, rice, barley, oat, mullet, soybean and/or corn. The sealant layer may also contain one or more of a liquid polyisoprene and short organic fibers. Preferably, the amorphous silica is a precipitated silica, namely aggregates of primary silica particles.

20 Claims, No Drawings

PNEUMATIC TIRE HAVING BUILT-IN COLORED SEALANT LAYER AND PREPARATION THEREOF

FIELD OF THE INVENTION

This invention relates to a pneumatic tire having a built-in non-black colored sealant layer and its preparation. The sealant layer is derived from a sealant precursor layer comprised of a butyl rubber, organoperoxide, particulate, synthetic amorphous silica and plant-derived organic agricultural seed flour, together with a non-black colored colorant. The butyl rubber-based sealant precursor layer is build into the tire to form a tire assembly and the butyl rubber component of the sealant precursor layer is depolymerized during a subsequent curing of the tire at an elevated temperature in a suitable mold to form the tire having the resultant built-in sealant. The particulate plant derived organic agricultural seed flour is a renewable raw material in a sense that it can be replenished in nature and therefore not as a significant depiction of non-renewable natural resource. The agricultural seed flour is comprised of at least a portion of a ground plant seed (e.g. whole or partial seed portion including for example its nucleus and/or shell) of an agricultural seed producing plant such as, for example, wheat, rye, rice, barley, oat, mullet, soybean and/or corn. The sealant layer may also contain one or more of a liquid polyisoprene and short organic fibers. Preferably, the amorphous silica is a precipitated silica, namely aggregates of primary silica particles.

BACKGROUND OF THE INVENTION

Various pneumatic tires have been proposed which contain a built-in sealant layer based upon a depolymerized butyl rubber layer.

For example, in U.S. Pat. No. 4,895,610 it is proposed to build a layer of butyl rubber-based composition into a tire which contains a polyisobutylene polymer and an organoperoxide, following which under a conditions of elevated temperature used to cure the tire, a major portion of the butyl rubber is presented as being depolymerized to form a tacky material which has puncture sealant properties.

U.S. Pat. Nos. 4,228,839, 4,171,237 and 4,140,167 also relate to a sealant layer in a tire formed by depolymerizing and crosslinking a butyl rubber based rubber composition, particularly by irradiation treatment.

U.S. patent application Ser. No. 10/171,057, filed Jun. 13, 2002, relates to a tire with built-in sealant comprised of a partially depolymerized butyl rubber via an organoperoxide which contains a particulate pre-cured rubber dispersed in said butyl rubber.

U.S. patent application Ser. No. 10/368,259, filed Feb. 17, 2003, relates to a tire with built-in sealant comprised of a partially depolymerized butyl rubber via an organoperoxide which contains a particulate filler comprised of carbon black and/or coal dust and optionally, a liquid diene based polymer, short fibers, hollow glass microspheres and rubber processing oil wherein said liquid polymer is not optional where said particulate filler is exclusively rubber reinforcing carbon black.

Historically, other patent publications relate to tire constructions, sealant compositions and methods wherein a sealant material is positioned between calendered rubber layers. For example, see U.S. Pat. No. 3,048,509 and said U.S. Pat. No. 4,228,839.

In the description of this invention, the term "agricultural seed flour" refers to seeds, including their embryo, or nucleus, and which may also include their accompanying seed shell and husk, obtained from cultivated, agricultural plants as hereinbefore discussed. Typically such grains, with or without their shell and/or husks, are ground into small particles and then usually sifted to through a fine mesh screen to obtain a relatively consistent average particle size which may sometimes be referred to as "flour".

The term "phr" is used to designate parts by weight of an ingredient per 100 parts of elastomer unless otherwise indicated. The terms "elastomer" and "rubber" are used interchangeably unless otherwise indicated. The terms "cure" and "vulcanize" are used interchangeably unless otherwise indicated.

SUMMARY AND PRACTICE OF THE INVENTION

In accordance with this invention, a pneumatic rubber tire of an open toroidal shape is provided which is comprised of a tire carcass having an included cavity with a rubber innerliner layer on its inner surface within said cavity characterized by an improvement which comprises a built-in, non-black colored, puncture sealing layer covered by said rubber innerliner layer, wherein said puncture sealing layer is comprised of an organoperoxide at least partially depolymerized butyl rubber (partially depolymerized by action of an organoperoxide), wherein said puncture sealing layer contains from zero to less than 0.5, preferably from zero to less than 0.2, phr and preferably exclusive of carbon black and is comprised of, based upon parts by weight per 100 parts by weight of said partially depolymerized butyl rubber:

(A) an organoperoxide at least partially depolymerized butyl rubber wherein said butyl rubber is comprised of a copolymer of isobutylene and isoprene comprised of about 0.5 to about 5, preferably from about 0.5 to about 1.0, percent units derived from isoprene;

(B) particulate filler, other than carbon black, comprised of:

(1) about 5 to about 90, alternately about 10 to about 20, phr of synthetic amorphous silica, preferably precipitated silica, preferably exclusive of a coupling agent for said silica, (2) from about 5 to about 40, alternately from about 5 to about 30, phr of agricultural organic plant seed flour, and (3) from zero to about 40, alternately about 5 to about 15, phr of clay, particularly kaolin clay;

(C) zero to about 6, alternately from about 0.5 to about 5, phr of short organic fibers, (D) optionally and preferably, a colorant in addition to than said silica, flour and clay, wherein said colorant of a color other than black, (to impart a non-black color to said sealant layer), wherein said colorant is selected from at least one of organic pigments, inorganic pigments and dyes, preferably selected from organic pigments and inorganic pigments;

(E) from zero to about 20, alternately about 4 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of from about 45 to about 55 w % eight percent, and (F) optionally, from zero to about 15, alternately from about 2 to about 5, phr of liquid cis 1,4-polyisoprene polymer.

Therefore, in practice, the said non-black colored sealant layer is covered by a rubber innerliner to separate the sealant layer from the internal cavity of the pneumatic tire. It is recognized that the tire cavity is designed to contain air, either under a pressure greater than atmospheric pressure.

In practice, said sealant layer may be positioned between a carbon black reinforced innerliner layer and rubber tire carcass or between two carbon black reinforced tire innerliner layers. In this manner, then, said non-black sealant layer is covered by at least one carbon black reinforced (and thereby of a black color) tire rubber innerliner layer but may, if desired, be sandwiched between rubber innerliner layers and thereby not in contact with said rubber tire carcass.

In practice, said non-black colored sealant layer promotes a potential visibility of a tire puncture (typically caused by a puncturing object) which extends through the tire innerliner if the sealant layer composition exudes through the puncture in the innerliner layer and thereby becomes visible.

In practice, it is desired herein for the butyl rubber-based sealant precursor composition to have a storage modulus $G'$ physical property, at a 5 percent dynamic strain at 80° C. and 1 hertz in a range of about 100 to about 400 kPa and said partially depolymerized butyl rubber sealant layer composition to have a significantly lower storage modulus $G'$ in range of about 5 to about 80, alternately in a range of from about 5 to about 50, kPa.

In practice, such storage modulus $G'$ may be determined, for example, by an RPA (Rubber Process Analyzer) instrument which measures the strain sweep at 80° C. at 1 Hertz over a range of, for example, from 1 to 50 percent strain sweep. A sample size of about 5.1 grams is used for the $G'$ determination. Such storage modulus ($G'$) measurement for rubber samples is well known to those having skill in such art. Such a Rubber Process Analyzer is RPA 2000™ instrument by Alpha Technologies, formerly the Flexsys Company and formerly the Monsanto Company. References to an RPA-2000 instrument may be found in the following publications: H. A. Palowski, et al, *Rubber World*, June 1992 and January 1997, as well as *Rubber & Plastics News*, Apr. 26 and May 10, 1993. Such method of determining the storage modulus is believed to be well known by those having skill in such art.

For the purposes of this invention the RPA instrument is operated at sample temperature of 80° C., a frequency of one Hertz and a dynamic strain sweep of from one to 50 percent strain from which the 5 percent strain is referenced, or used, for the storage modulus $G'$ value. For the purposes of determining the storage modulus $G'$ for this invention, the sample is heated to 170° C. for 12 minutes, followed by the 80° C., one Hertz strain sweep of from 1 to 50 percent by the RPA Series 2000 instrument.

The plant derived seed-flour material is envisioned herein as ground and sifted plant seeds, preferably from a cultivated agricultural plant, selected from, for example, wheat, rye, oat, corn, barley, mullet, soybean and/or rice or a mixture of two or more thereof. The term plant seed as used herein is intended to the embryo, and, if desired, the covering for the embryo which may include its husk. Such flour is typically of a whitish color.

The aforesaid amorphous silica is preferably a precipitated silica in a form of aggregates of primary silica particles. Said silica is typically inherently a whitish color.

Various precipitated silicas may be used, such as, for example, and not intended to limiting, HiSil 210™, HiSil 546™ and HiSil 532™ from PPG Industries, Hubersil 4155™ from the J. M. Huber Company and Ultrasil™ VN2 and VN3 from the Degussa Company.

In practice, various optional clays may be used, representative of which are, for example, kaolin clay. The term "clay" is intended herein to include water washed clay and mercaptosilane treated (pre-treated) clay. Such clay is typically of an off-white, often a tan, color. It is envisioned herein that a benefit of the clay is to provide a modified, or tempered, degree of reinforcement, or stability, for the sealant composition as an aid to the aforesaid amorphous silica in providing a resultant storage modulus $G'$ property for the sealant composition.

Where the optional clay is used, weight ratio of said precipitated silica to clay may be, for example, in a range of from about 0.5/1 to about 10/1.

The optional short organic fibers may be natural or synthetic organic fibers such as, for example, cotton fibers and synthetic fibers such as, for example, rayon, aramid, nylon and polyester fibers, and their mixtures. In practice, such cotton short fibers may have an average length, for example, in a range of up to about 200 microns (e.g. an average length of about 150 microns) and the synthetic fibers (e.g. the polyester and nylon fibers) may have an average length, for example, of up to a maximum of about 2,500 microns. The short fibers are considered herein to aid in promoting the effectiveness of the sealing ability of the resultant sealant composition and in promoting an appropriate storage modulus ($G'$) of the resultant sealant composition. In relatively low concentrations, such synthetic fibers are not seen herein as significantly interfering with the processing of the sealant precursor composition yet as promoting the effectiveness of the resultant built-in sealant layer for its puncture sealing ability.

The colorant may be, for example, an organic, or inorganic, material of a color other than, and preferably significantly contrasting to, a black color. In practice, the pigment colorant may be a composite of the colorant pigment and an elastomer such as for example, EPR (ethylene/propylene copolymer rubber) and/or SBR (styrene/butadiene copolymer rubber).

In practice, the colorant may be comprised of titanium dioxide pigment. For example, the colorant of such sealant composition may preferably be composed of titanium dioxide where a white colored sealant layer is desired. Also, such colorant may contain, or be comprised of titanium dioxide as a color brightener together with at least one non-black organic pigment and/or non-black inorganic pigment or dye.

Various colorants, in addition to said silica, clay and flour, may be used to provide a non-black color to the sealant and sealant precursor composition. Representative of such colorants are, for example, yellow colored pigments as Stantone D-1102™ yellow pigment, understood to be a diarylide based yellow pigment, from PolyOne Corporation and Akrosperse E-6837™ yellow EPMB pigment masterbatch with an EPR (ethylene/propylene rubber) from the Akrochem Company. Additional colorant pigment candidates include (some of which may be a blend of pigments), for example, and not intended to be limiting, E-1006™ violet; E-7420™ yellow; E-4686™ red; E-18016™ white; E-2773™ green and E-632™ blue from Akrochem Company. As discussed above, such colored pigments may be used in combination and therefore together with titanium dioxide.

The various rubber processing oils are well known to those having skill in such art. For this invention, a rubber processing oil having a low aromaticity content is preferred, namely a rubber processing oil having an aromaticity content of less than about 15 weight percent. Such a preferred rubber processing oil may be composed of, for example, about 35 to about 45 weight percent naphthenic content, about 45 to about 55 weight percent paraffinic content and an aromatic content of less than about 15 weight percent (e.g. from about 10 to about 14 weight percent). It is considered herein that a representative of such preferred rubber processing oil is Flexon 641™ from the ExxonMobil Company.

In practice, a pneumatic tire having a puncture sealing ability as a tire assembly comprised of an assembly of components comprised of an outer circumferential (sulfur curable) rubber tread, rubber carcass supporting said tread (containing cord reinforced, sulfur curable, carbon black reinforced rubber plies) and an inner (carbon black reinforced and usually sulfur curable) halobutyl rubber tire innerliner layer, may be prepared by, for example:

(A) positioning a layer of an uncured butyl rubber-based rubber composition, exclusive of sulfur curative, as a sealant layer precursor between said innerliner and rubber carcass or between two of said innerliners, wherein said sealant precursor butyl based rubber composition is comprised of, based upon parts by weight per 100 parts of butyl rubber (phr):

(1) 100 parts by weight of butyl rubber as a copolymer comprised of isobutylene and isoprene which contains from about 0.5 to about 5 weight percent units derived from isoprene, (2) about 5 to about 90 phr of particulate filler, which contains from zero to about 0.5, preferably from zero to about 0.2, and more preferably exclusive of carbon black, comprised of:

(3) about 5 to about 90, alternately about 10 to about 20, phr of particulate amorphous silica aggregates, preferably precipitated silica, (4) about 5 to about 40, alternatively from about 5 to about 30, phr of agricultural plant-derived seed-flour, (5) from zero to about 20, alternately about 5 to about 10, phr of clay, (6) from zero to about 6, alternately from about 0.5 to about 5, phr of said short organic fiber, (7) from zero to about 15, alternately about 2 to about 5, phr of liquid polyisoprene, (8) optionally and preferably non-black colored pigment colorant, in addition to said silica, flour and clay, to impart a non-black color to said sealant precursor butyl rubber composition.

(9) from zero to about 20, alternately about 4 to about 15, phr of rubber processing oil, preferably a rubber processing oil having a maximum aromatic content of about 15 weight percent, and preferably a naphthenic content in a range of from about 35 to about 45 weight percent and preferably a paraffinic content in a range of about 45 to about 55 weight percent; and

(10) an active organoperoxide (e.g. from about 0.5 to about 10 parts by weight per 100 parts by weight of the butyl rubber)

(B) vulcanizing said tire assembly at a temperature in a range of from about 130° C. to about 175° C. for a sufficient period of time to partially depolymerize said butyl rubber and thereby form a built-in sealant layer within said tire assembly.

It is envisioned that one aspect of this invention is the partial depolymerization of the butyl rubber to reduce its storage modulus G' (80° C.) from a value in a range of from about 100 to about 400, alternately from 140 to 270, kPa to a value in a range of from about 5 to about 50 kPa.

This is considered herein to be significant because said butyl rubber sealant precursor having the G' in a range of from about 100 to about 400, alternately from 140 to 270, kPa is normally a rubber composition which is conventionally processable as a rubber composition which can be suitably built as a rubber layer into a tire. Furthermore, this is considered herein to be significant because said built-in sealant layer as the depolymerized butyl rubber composition, obtained after the curing of the tire assembly at an elevated temperature, having a G' in a range of from 5 to about 30 kPa, is considered to provide a suitable built-in sealant layer for the pneumatic tire.

In one aspect, it is preferred that the units derived from isoprene of the butyl rubber isobutylene/isoprene copolymer is less than three mole percent and more preferably in a range of from 0.5 to 1.0 mole percent of the copolymer. Such butyl rubber preferably has a Mooney ML (1+8 at 125° C.) viscosity value in a range of from about 20 to about 50, preferably from about 30 to about 40.

Upon sulfur vulcanization of the tire assembly under conditions of elevated temperature, a major portion of the uncured butyl rubber based composition is considered herein to be depolymerized in the presence of the organoperoxide compound to form a tacky material which has puncture sealing properties.

In practice, said tire innerliner halobutyl layer is typically a sulfur curative-containing halobutyl rubber composition of a halobutyl rubber such as for example chlorobutyl rubber or bromobutyl rubber.

Such tire halobutyl rubber based innerliner layer may also contain one or more sulfur curable diene-based elastomers such as, for example, cis 1,4-polyisoprene natural rubber, cis 1,4-polybutadiene rubber and styrene/butadiene rubber, and their mixtures, or more preferably a combination of one or more of said halobutyl rubbers and said diene based elastomers.

In practice, the butyl rubber based sealant precursor composition contains a sufficient amount of organoperoxide to cause the butyl rubber to partially depolymerize, usually in a range of from about 0.5 to about 10 phr of the active organoperoxide depending somewhat upon the time and temperature of the tire curing operation and the degree of depolymerization desired.

Various organoperoxides may be used in the polymer (sealant) composition layer. Preferably organoperoxides are desired which become activate (e.g. generate peroxide free radicals) at high temperatures, that is, above about 100° C. Such organoperoxides are referred to therein as active peroxides. Examples of such organoperoxides which are considered herein as being active organoperoxides are, for example, tertbutyl perbenzoate and dialkyl peroxides with the same or different radicals, such as dialkylbenzene peroxides and alkyl pre-esters. Preferably the active organoperoxide will contain two peroxide groups. Frequently the peroxide groups are attached to a tertiary butyl group. The basic moiety on which the two peroxide groups are suspended can be aliphatic, cycloaliphatic, or aromatic radicals. Some representative examples of such active organoperoxides are, for example, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy)hexane-3; p-chlorobenzyl peroxide; 2,4-dichlorobenzyl peroxide; 2.2-bis-(t-butyl peroxy)-butane; di-t-butyl peroxide; benzyl peroxide; 2,5-bis(t-butyl peroxy)-2,5-dimethyl hexane, dicumyl peroxide;

and 2,5-dimethyl-2,5-di(t-butyl peroxy)hexane. Dicumylperoxide may be a desired active organoperoxide.

Such active organoperoxides may be added to the butyl rubber based sealant precursor composition typically on a free-flowing mineral carrier, such as, for example, calcium carbonate. The organoperoxide on a mineral carrier is preferred for storing the peroxide and handling and processing safety. Such carrier composition containing from about 35 to 60 weight percent active ingredient (peroxide) can be employed very successfully. For example, 40 percent by weight dicumylperoxide on an inert carrier may be employed in the butyl rubber composition sealant layer.

The various components of the sealant layer can be mixed together using any convenient rubber mixing equipment, particularly an internal rubber mixer. The rubber composition used in the sealant layer typically has sufficient viscosity and unvulcanized tack to enable its incorporation into an unvulcanized tire without departing from standard, long standing tire building techniques and without the use of complicated, expensive tire building equipment.

The butyl rubber based rubber composition can be formed into a strip of unvulcanized rubber, by using conventional equipment such as a calender, extruder, or any combination thereof, and the strip is assembled into an uncured tire assembly of components. For example, a rubber innerliner of a butyl rubber based (e.g. bromobutyl rubber) rubber composition may be first applied to a building drum and then the strip of the butyl rubber based sealant precursor layer is applied to the layer of innerliner. The remainder of the tire component assembly, including a rubber tire carcass cord reinforced ply being applied over said butyl rubber sealant precursor strip. The butyl rubber based sealant precursor layer is thereby assembled into the unvulcanized tire assembly of components between an innerliner layer and tire carcass.

The strip of unvulcanized butyl rubber composition employed as in the sealant composition layer may extend, for example, from one shoulder of the tire to the other through the crown area or region of the tire. The thickness of the sealant composition layer can vary greatly in an unvulcanized puncture sealant containing tire. Generally, the thickness of the sealant composition layer may range from about 0.13 cm (0.05 inches) to about 1.9 cm (0.75 inches). In passenger tires it is normally desired for the sealant composition layer to have a thickness of about 0.32 cm (0.125 inches) whereas for truck tires, a thickness of about 0.76 cm (0.3 inches) or greater might be desired.

After the unvulcanized pneumatic rubber tires of this invention are assembled they are vulcanized using a normal tire cure cycle. The tires of this invention can be cured over a wide temperature range. For example, passenger tires might be cured at a temperature ranging from about 150° C. to about 180° C. and truck tires might be cured at a temperature ranging from about 130° C. to about 170° C. Thus, a cure temperature may range, for example, from about 130° C. to about 180° C. and for a period of time (e.g. from about 7 to about 35 minutes or even up to about 12 hours for vary large tires depending somewhat upon the size of the tire and the degree of desired depolymerization of the butyl rubber) and sufficient to at least partially depolymerize said sealant precursor composition to the aforesaid storage modulus (G') property. In practice, a period of time used to vulcanize the tires, in a suitable mold, may therefore, for example, have a duration of about 10 to 14 minutes for a passenger tire and for about 25 to about 35 minutes for a truck tire.

Accordingly, in one aspect of the invention, a self-sealing pneumatic rubber tire of this invention is envisioned wherein the tire has sidewalls, a supporting carcass, inextensible beads, an innerliner (air barrier layer), a sealant layer, and an outer circumferential tread (tread portion). The individual sidewalls extend radially inward from the axial outer edges of the tread portion to join the respective inextensible beads. The supporting carcass acts as a supporting structure for the tread portion and sidewalls. The sealant layer is disposed between said supporting carcass and said innerliner. The outer circumferential tread is adapted to be ground contacting w hen the tire is in use.

The following examples are included to further illustrate the method of manufacturing the self-sealing pneumatic rubber tires of this invention. These examples are intended to be representative of the present invention and are not to be regarded as limiting the scope of the invention or the manner in which it can be practiced. Unless specifically indicated otherwise, parts and percentages are given by weight.

EXAMPLE I

A butyl rubber based sealant precursor composition is prepared by blending a mixture comprised of butyl rubber, precipitated silica and plant derived seed-flour in an internal rubber mixer in a non-productive mixing stage (without the organoperoxide) for about 4 minutes to a temperature of about 160° C. at which time the rubber mixture was dumped from the mixer and allowed to cool to a temperature below 40° C. The mixture was then mixed in an internal rubber mixer in a productive mixing stage (with the organoperoxide) with the active organoperoxide for about 2 minutes to a temperature of about 108° C. at which time the mixture was dumped from the mixer and allowed to cool to a temperature below 40° C. The rubber composition was comprised of the ingredients shown in the following Table 1.

TABLE 1

| Material | Parts by Weight |
|---|---|
| Non Productive mixing stage | |
| Butyl rubber[1] | 100 |
| Organic seed flour[2] | 25 |
| Precipitated silica[3] | 7 |
| Colorant[4] | 0.5 |
| Titanium dioxide[5] | 3 |
| Processing oil[6] | 4 |
| Liquid polyisoprene[7] | 2.4 |
| Productive Mixing Stage | |
| Organoperoxide[8] | 5.3 |

[1]Butyl rubber obtained as Exxon 065 ™ from the ExxonMobil Company
[2]Organic flour obtained as being distributed by the Giant Eagle grocery company as Giant Eagle ® All Purpose Flour, Enchriched, Bleached and Sifted reportedly composed of: enchriched bleached wheat flour (niacin, iron reduced) thiamine, mononitrate vitamin B1), riboflavin (Vitamin B2), folic acid and malted barley flour
[3]Silica as HiSil 243 LD ™ from the PPG Industries Company
[4]Colorant as a Stantone D-1102 ™ yellow pigment from the PolyOne Company
[5]Titanium dioxide as Ti-Pure ™ R101 from the DuPont Company
[6]Rubber processing oil as Flexon 641 ™ from the Exxon Mobil Company reportedly as a naphthenic, paraffinic rubber processing oil having a maximum aromatic content of less than 15 weight percent
[7]LIR50 ™ from the Kuraray Company
[8]Composite of dicumyl peroxide on a mineral carrier in a 60/40 weight ratio and reported in Table 1 as the composite.

The Sample was tested by an RPA Series 2000 instrument as hereinbefore described and the storage modulus G' (80° C.), one Hertz and 5 percent strain reported for the Sample before and after heating to a temperature of about 170° C. for about 12 minutes to activate the dicumyl peroxide was determined.

Storage modulus G' (at 80° C.) values for the Sample were observed from a temperature versus viscoelastic property sweep as hereinbefore described with said RPA 2000 rheometer operated at a 5 percent torsional strain and 10 Hertz frequency, the methodology of which is hereinbefore discussed.

The storage modulus G' (at 80° C.) value for the rubber compositions where the dicumyl peroxide was not activated (the sample not pre-heated to 170° C. for 12 minutes), and thus representing the sealant precursor, was determined to be 219 kPa.

The storage modulus G' value for the rubber compositions where the dicumyl peroxide was activated (the sample pre-heated to 170° C. for 12 minutes), and thus representing the sealant of at least partially depolymerized butyl rubber, was determined to be 7 kPa.

Therefore, it was observed that the butyl rubber-based sealant precursor composition has a storage modulus G' physical property, at a 5 percent dynamic strain at 80° C. and 1 hertz of 219 kPa, namely within the aforesaid desirable a range of about 100 to about 400 kPa, and said partially depolymerized butyl rubber sealant layer composition was observed to have a significantly lower storage modulus G' of 7 kPa, namely within the aforesaid desirable range of about 5 to about 80 kPa.

EXAMPLE II

A tubeless pneumatic steel belted rubber tire of the type P225/60/R16 passenger tire is prepared by first applying a standard butyl rubber innerliner layer (e.g. bromobutyl rubber composition) to a standard building drum. Then a layer of butyl rubber based sealant precursor composition of Example I having a thickness of about 0.76 cm (0.3 inches) is applied to the innerliner layer on the building drum.

The tread portion, side-walls, beads, and supporting carcass are then assembled into the tire using conventional techniques utilized in the manufacture of steel belted radial tires to form a green, unvulcanized with the built-in sealant precursor layer. The resulting tire is cured in a suitable tire mold at temperature of about 150° C. for about 30 minutes to form a tire with a built-in sealant layer having a thickness of about 0.125 inches (about 0.32 cm) formed by a partial depolymerization of the butyl rubber component by the organo peroxide of the sealant precursor layer at the elevated tire cure temperature.

The tire was mounted on a metal rim and inflated to a suitable inflation pressure. The tire was punctured by driving a combination of nails of various diameters, namely a combination of No. 8, box nails, No. 12 box nails and No. 20 common nails, into the tread and extending through the built-in sealant layer onto the air pressured cavity of the inflated tire. The punctured inflated tire was run under a load of 90 percent of the rated load of the tire against a dynamometer at suitable vehicular speeds of up to 90 kilometers per hour. It was observed that the built-in sealant layer satisfactorily sealed the punctured tire from loss of air from within its air inflated cavity with only a minimal drop in air pressure over a suitable period of time.

The tire test procedure is more fully described as follows. The cued tire containing the built-in, encapsulated sealant layer is tested for sealing efficiency in the following manner. A minimum of two tires per test is required. The tire is mounted on a metal rim and inflated to a test inflation pressure (size dependant). The tire is mounted against a 67 inch (164 cm) diameter road wheel dynamometer which has loaded radius or pressure monitoring equipment attached. This equipment can detect minor changes in inflation pressure and corresponding changes in loaded radius resulting from a pressure drop. It has the capability of stopping the test wheel whenever pre-determined set points are reached. A load equal to 90 percent of maximum load is applied and the tire broken in for 160 Km at 90 Km/h. Following break in, the inflation is reset to the test inflation. The tire is then punctured using 24 nails (eight each of three nail sizes) around its circumference with nail punctures being applied to major groove areas nearest the center of the tread and adjacent to the tire's shoulder rib.

Inflation pressure is reset to the test inflation immediately after nail punctures are completed.

Nail-Removed Test

Remove the 12 nails (4 each of the three sizes) and determine if (hot) loaded radius drops below radius limit set point or inflation pressure drops 60 kPa from cold set point. Plug leaking hole(s) and allow the tire to cool to ambient temperature, re-inflate the tire to test inflation and continue the test.

Nail-Retained Test

Run tire on dynamometer at 90 km/h with 12 nails in place and interrupt the test if (hot) loaded radius drops below radius limit set point or if inflation pressure (hot) drops 60 kPa from cold set point. Plug any leaking hole(s) and allow tires to cool to ambient temperature and re-inflate the tire to test inflation and continue to test. Inspect the tire every eight hours for structural damage and stop test if said condition is found. Stop and finish the test at 16,000 km (178 hr).

Determination of Test Success

Each puncturing object retained or removed is considered a separate test. Sealant test success occurs if the tire loaded radius remains above the radius limit set point or if the tire inflation pressure remains equal to or greater than the test inflation less 60 kPa throughout the test. The sealant tire is graded upon its ability to successfully seal punctures for both nail-removed and nail-retained tests. A sealing efficiency grade of greater than 70 percent for all punctures is considered a successful test.

While certain representative embodiments and details have been shown for the purpose of illustrating the invention it will be apparent to those skilled in this art that various changes and modifications may be made therein without departing from the spirit or scope of the invention.

What is claimed is:

1. A pneumatic rubber tire of an open toroidal shape comprised of a tire carcass having an included cavity with a rubber innerliner layer on its inner surface within said cavity characterized by an improvement which comprises a built-in, non-black colored, puncture sealing layer covered by said rubber innerliner layer, wherein said puncture sealing layer is comprised of an organoperoxide partially depolymerized butyl rubber, wherein said puncture sealing layer contains from zero to 0.5 phr of carbon black and is comprised of, based upon parts by weight per 100 parts by weight of said partially depolymerized butyl rubber:

(A) an at least partially organoperoxide-depolymerized butyl rubber wherein said butyl rubber is comprised of a copolymer of isobutylene and isoprene comprised of about 0.5 to about 5 percent units derived from isoprene;
(B) particulate filler, other than carbon black, comprised of:
(1) about 5 to about 90 phr of synthetic amorphous silica,
(2) about 5 to about 40 phr of agricultural organic plant seed flour, and
(3) from zero to about 40 phr of clay,
(C) from zero to about 6 phr of short organic fibers,
(D) optionally a colorant of other than a black color and in addition to said silica, flour and clay, wherein said colorant is selected from at least one of organic pigments, inorganic pigments and dyes, preferably selected from organic pigments and inorganic pigments;
(E) from zero to about 20 phr of rubber processing oil, and
(F) from zero to about 15 phr of liquid cis 1,4-polyisoprene polymer.

2. The tire of claim 1 wherein:
(A) said organoperoxide partially depolymerized butyl rubber is comprised of a copolymer of isobutylene and isoprene comprised of about 0.5 to about 1.0 percent units derived from isoprene;
(B) said particulate filler is comprised of:
(1) about 10 to about 20 phr of precipitated silica exclusive of a coupling agent for said silica,
(2) about 5 to about 30 phr of agricultural organic plant seed flour, and
(3) from zero to about 40 of kaolin clay;
(C) zero to about 6 phr of short organic fibers,
(D) said colorant;
(E) from zero to about 20 phr of rubber processing oil having a maximum aromatic content of about 15 weight percent, and
(F) from zero to about 15 phr of liquid cis 1.4-polyisoprene polymer.

3. The tire of claim 2 wherein, for said puncture sealant layer, said particulate filler, exclusive of carbon black, is comprised of:
(A) about 10 to about 20 phr of precipitated silica,
(B) about 5 to about 30 phr of agricultural organic plant seed flour,
(C) zero to about 40 phr of said clay,
(D) zero to about 6 phr of short organic fibers, and
(E) and said colorant.

4. The tire of claim 2 wherein said puncture sealing layer contains from about 0.5 to about 5 phr of short organic fibers.

5. The tire of claim 2 wherein, for said puncture sealing layer, said colorant is selected from pigments and inorganic pigments.

6. The tire of claim 2 wherein, for said puncture sealing layer, said colorant is comprised of titanium dioxide.

7. The tire of claim 2 wherein, for said puncture sealing layer, said rubber processing oil has a maximum aromatic content of about 15 weight percent, a naphthenic content in a range of from about 35 to about 45 weight percent and a paraffinic content in a range of from about 45 to about 55 weight percent.

8. The tire of claim 2 wherein said puncture sealing layer contains from about 2 to about 5 phr of liquid cis 1,4-polyisoprene polymer.

9. The tire of claim 2 wherein said puncture sealant layer has storage modulus (G') in a range of from about 5 to about 50 kPa.

10. The tire of claim 3 wherein said puncture sealing layer contains from about 0.5 to about 5 phr of short organic fibers.

11. The tire of claim 3 wherein said puncture sealing layer contains from 5 to 15 phr of kaolin clay.

12. The tire of claim 3 wherein, for said puncture sealing layer, said colorant is selected from pigments and inorganic pigments.

13. The tire of claim 3 wherein, for said puncture sealing layer, said colorant is comprised of titanium dioxide.

14. The tire of claim 3 wherein, for said puncture sealing layer, said rubber processing oil has a maximum aromatic content of about 15 weight percent, a naphthenic content in a range of from about 35 to about 45 weight percent and a paraffinic content in a range of from about 45 to about 55 weight percent.

15. The tire of claim 3 wherein said puncture sealing layer contains from about 2 to about 5 phr of liquid cis 1,4-polyisoprene polymer.

16. The tire of claim 3 wherein said puncture sealant layer has storage modulus (G') in a range of from about 5 to about 50 kPa.

17. The tire of claim 1 wherein said silica is precipitated silica.

18. The tire of claim 1 wherein said puncture sealing layer is exclusive of a coupling agent for said silica.

19. A method of preparing a pneumatic tire having a puncture sealing ability as a tire assembly comprised of an assembly of components comprised of an outer circumferential rubber tread, rubber carcass supporting said tread and an inner halobutyl rubber tire innerliner layer, which comprises:
(A) positioning a layer of an uncured butyl rubber-based rubber composition, exclusive of sulfur curative, as a sealant layer precursor between said innerliner and rubber carcass or between two of said innerliners, wherein said sealant precursor butyl based rubber composition is comprised of, based upon parts by weight per 100 parts of butyl rubber (phr):
(1) 100 parts by weight of butyl rubber as a copolymer comprised of isobutylene and isoprene which contains from about 0.5 to about 5 weight percent units derived from isoprene,
(2) about 5 to about 90 phr of particulate filler, exclusive of carbon black, comprised of:
(3) about 5 to about 90 phr of particulate amorphous silica aggregates,
(4) about 5 to about 40 phr of plant-derived seed-flour,
(5) from zero to about 20 phr of clay,
(6) from zero to about 6 phr of short organic fibers,
(7) from zero to about 15 phr of liquid polyisoprene,
(8) non-black colored pigment colorant to impart a non-black color to said sealant precursor butyl rubber composition,
(9) from zero to about 20 phr of rubber processing oil, and
(10) an active organoperoxide; and
(B) vulcanizing said tire assembly at a temperature in a range of from about 130° C. to about 175° C. for a sufficient period of time to partially depolymerize said butyl rubber and thereby form a built-in sealant layer within said tire assembly.

20. The method of claim 19 wherein said silica is precipitated silica.

* * * * *